(12) United States Patent
Sonobe

(10) Patent No.: US 10,187,138 B2
(45) Date of Patent: Jan. 22, 2019

(54) RELAYING DEVICE, AUDIO COMMUNICATION SYSTEM, AND AUDIO SIGNAL RELAY METHOD

(71) Applicant: ICOM INCORPORATED, Osaka (JP)

(72) Inventor: Hirotaka Sonobe, Osaka (JP)

(73) Assignee: ICOM INCORPORATED, Osaka (JP)

(*) Notice: Subject to any disclaimer, the term of this patent is extended or adjusted under 35 U.S.C. 154(b) by 142 days.

(21) Appl. No.: 15/123,913

(22) PCT Filed: Nov. 27, 2014

(86) PCT No.: PCT/JP2014/081404
§ 371 (c)(1),
(2) Date: Sep. 6, 2016

(87) PCT Pub. No.: WO2015/133021
PCT Pub. Date: Sep. 11, 2015

(65) Prior Publication Data
US 2017/0019164 A1   Jan. 19, 2017

(30) Foreign Application Priority Data

Mar. 7, 2014 (JP) .................................. 2014-045457

(51) Int. Cl.
*H04W 84/20* (2009.01)
*H04B 7/14* (2006.01)
*H04W 4/06* (2009.01)

(52) U.S. Cl.
CPC ................ *H04B 7/14* (2013.01); *H04W 4/06* (2013.01); *H04W 84/20* (2013.01)

(58) Field of Classification Search
CPC .......... H04B 7/14; H04W 4/06; H04W 84/20; H04L 12/00; H04L 12/16; H04L 12/18;
(Continued)

(56) References Cited

U.S. PATENT DOCUMENTS

| 4,790,003 A | * | 12/1988 | Kepley | ............. H04M 3/53325 379/142.01 |
| 9,620,087 B2 | * | 4/2017 | Yu | ............................ G09G 5/34 |

(Continued)

FOREIGN PATENT DOCUMENTS

JP    2014-087027 A    5/2014

OTHER PUBLICATIONS

Supplementary European Search Report of the corresponding EP application No. 14884826 dated Sep. 21, 2017.
(Continued)

*Primary Examiner* — Mohamed A Kamara
(74) *Attorney, Agent, or Firm* — Muncy, Geissler, Olds & Lowe, P.C.

(57) ABSTRACT

[Problem] To provide an audio communication system wherein a relaying device is connected to terminal devices, which are communication devices, via a communication network and wherein the relaying device is caused to manage the group of the terminal devices.
[Solution] An audio communication system comprises: a master relaying device; one or more slave relaying devices connected to the master relaying device via a communication network; and one or more terminal devices connected to each relaying device via a communication network. Each slave relaying device transfers, to the master relaying device, audio signals received from the terminal device in charge of the slave relaying device. The master relaying device transfers the audio signals, which were received from each slave relaying device, to the slave relaying devices other than that slave relaying device.

5 Claims, 5 Drawing Sheets

(58) Field of Classification Search
CPC .............. H04L 12/1813; H04L 12/1827; H04L 29/06027; H04L 29/06414; H04L 29/00; H04L 29/06401; H04L 29/06034; H04M 3/42; H04M 3/487; H04M 7/0081
See application file for complete search history.

(56) References Cited

U.S. PATENT DOCUMENTS

| | | | |
|---|---|---|---|
| 2005/0018820 A1* | 1/2005 | Chaddha | H04L 51/24 379/88.13 |
| 2006/0058007 A1* | 3/2006 | Choksi | G06Q 30/0225 455/406 |
| 2008/0160977 A1 | 7/2008 | Ahmaniemi et al. | |
| 2013/0342579 A1* | 12/2013 | Yu | G09G 5/34 345/649 |

OTHER PUBLICATIONS

International Search Report of PCT/JP2014/081404.
Kenwood, a wireless apparatus for business use TCP-U90F, URL: http://www.kenwood.com/jp/business/tcp_u90f/, Retrieved on Mar. 15, 2016, p. 1-7.

* cited by examiner

| CALL TYPE | CALL DESTINATION ID | TERMINAL INFORMATION | SERVER INFORMATION |
|---|---|---|---|
| INDIVIDUAL | 001 | 001 | - |
| ⋮ | ⋮ | ⋮ | ⋮ |
| INDIVIDUAL | 033 | - | S3 |
| GROUP | G2 | 001 | S1,S2 |
| GROUP | G3 | - | S1,S2,S3 |
| PLENARY | - | 001,002,003 | S1,S2,S3 |

| CALL TYPE | CALL DESTINATION ID | TERMINAL INFORMATION | SERVER INFORMATION |
|---|---|---|---|
| INDIVIDUAL | 001 | - | M |
| ⋮ | ⋮ | ⋮ | ⋮ |
| INDIVIDUAL | 033 | - | S3 |
| GROUP | G1 | 011,012,013 | - |
| GROUP | G2 | 011 | M |
| GROUP | G3 | 012 | M |
| PLENARY | - | 011,012,013 | M |

| CALL TYPE | CALL DESTINATION ID | TERMINAL INFORMATION | SERVER INFORMATION |
|---|---|---|---|
| INDIVIDUAL | 001 | - | M |
| ⋮ | ⋮ | ⋮ | ⋮ |
| INDIVIDUAL | 033 | - | S3 |
| GROUP | G2 | 021 | M |
| GROUP | G3 | 022 | M |
| PLENARY | - | 021,022,023 | M |

| CALL TYPE | CALL DESTINATION ID | TERMINAL INFORMATION | SERVER INFORMATION |
|---|---|---|---|
| INDIVIDUAL | 001 | - | M |
| ⋮ | ⋮ | ⋮ | ⋮ |
| INDIVIDUAL | 033 | 033 | - |
| GROUP | G3 | 032 | M |
| PLENARY | - | 031,032,033 | M |

RELAYING DEVICE, AUDIO COMMUNICATION SYSTEM, AND AUDIO SIGNAL RELAY METHOD

TECHNICAL FIELD

The present invention relates to an audio communication system using a network such as a wireless LAN.

BACKGROUND ART

As devices for wireless audio communication, a so-called radio transceiver (terminal device) for transmitting a high-frequency carrier which is a continuous time signal by modulating it with an analog signal or a digital signal has been on a mainstream. The radio transceiver basically performs one-to-one communication, but those having a group communication function for communicating among a plurality of the radio transceivers have been proposed.

The applicant has proposed full-duplex group communication using a relaying device in previous applications such as Japanese Patent Laid-Open No. 2014-087027 (non-disclosed at the date of basic application), for example.

CITATION LIST

Patent Literature

[Patent Literature 1] Japanese Patent Laid-Open No. 2014-087027

Non-Patent Literature

[Non-Patent Literature 1] JVCKENWOOD Corporation, Business Transceiver, TCP-U90F, [online] [searched on Nov. 5, 2013], Internet URL: http://www2.jvckenwood.com/business/tcp_u90f/

Problem to be Solved by Invention

The number of transceivers that can be managed by one unit of a relaying device is limited. If the transceivers exceeding the limited number are to communicate with each other, another communication method via an SIP server or the like has to be used in the prior art, by which instantaneousness of communication is lost and processing is cumbersome.

The present invention has an object to enable mutual communication of a large number of terminal devices by mutually linked a plurality of relaying devices. The present invention has an object to provide a relaying device and an audio communication system capable of full-duplex group communication by a large number of terminal devices.

SUMMARY OF THE INVENTION

The relaying device of the present invention comprises a network communication unit and a control unit. The network communication unit is connected to a communication network and is capable of communication with a plurality of subordinate terminal devices via the communication network and also is capable of communication with another relaying device having other subordinate terminal devices. The control unit operates itself in a master mode or in a slave mode and operates as follows during group communication in which two or more terminal devices communicate with each other. When the control unit is in the master mode, the control unit transfers an audio signal received from the subordinate terminal device to the subordinate terminal devices excluding the transmitting terminal device (the terminal device transmitting the audio signal) and the relaying device in the slave mode, and also transfers an audio signal received from the relaying device in the slave mode to the other relaying devices in the slave mode excluding the transmitting relaying device (the relaying device transmitting the audio signal) in the slave mode and the subordinate terminal devices. When in the slave mode, the control unit transfers an audio signal received from the subordinate terminal device to the subordinate terminal devices excluding the transmitting terminal device and the connected relaying device in the master mode, and also transfers an audio signal received from the relaying device in the master mode to the subordinate terminal device.

In the aforementioned invention, during individual communication in which communication is conducted between the subordinate terminal device and another terminal device subordinate to another relaying device, the control unit may transfer the audio signal received from the subordinate terminal device directly to the another relaying device managing the another terminal device.

An audio communication system of the present invention has one unit of master relaying device and one or more slave relaying devices connected to each other and one or more terminal devices connected to each of the relaying devices via a communication network. During group communication in which two or more terminal devices belonging to a group communicate with each other in the group, the slave relaying device transfers an audio signal received from the subordinate terminal device to the terminal devices belonging to the subordinate group excluding the transmitting terminal device and to the master relaying device and transfers an audio signal received from the master relaying device to all the terminal devices belonging to the subordinate group. The master relaying device transfers an audio signal received from the subordinate terminal device to the terminal devices belonging to the subordinate group excluding the transmitting terminal device and to the slave relaying device managing the terminal devices belonging to the group and transfers an audio signal received from the slave relaying device to the slave relaying device managing the terminal devices belonging to the group excluding the transmitting slave relaying device and to all the terminal devices belonging to the subordinate group.

In the aforementioned invention, it may be so configured that a plurality of the relaying devices are provided and each of the relaying devices operates as a master relaying device with respect to a part of a plurality of the group communications and as a slave relaying device with respect to the other group communications in a plurality of groups.

In the aforementioned invention, it may be so configured that a first-layer relaying device, a second-layer relaying device, and a third-layer relaying device are provided, the first-layer relaying device performs transfer of the audio signal as a master relaying device with the second-layer relaying device, the second-layer relaying device performs transfer of the audio signal as a master relaying device with the third-layer relaying device and also performs transfer of the audio signal as a slave relaying device with the first-layer relaying device, and the third-layer relaying device performs transfer of the audio signal as a slave relaying device with the second-layer relaying device. The present invention can be applied not only to the three-layered audio communication system but also to an audio communication system having four layers or more. In that case, the audio communication system with four layers or more can be realized by overlapping a plurality of the second-layer relaying devices. Moreover, even in the audio communication system having four layers or more, since the continuous three layers in them constitute the first-layer relaying device, the second-layer relaying device, and the third-layer relaying device, it is included in a technical range of the present invention.

In an audio signal relay method of the present invention, a relaying device comprising a network communication unit connected to a communication network and capable of communication with a plurality of subordinate terminal devices via the communication network and capable of communication with other relaying devices having other subordinate terminal devices executes the following processing. The relaying device in a master mode transfers an audio signal received from the subordinate terminal device to the subordinate terminal devices excluding the transmitting terminal device and the other relaying devices and transfers an audio signal received from another relaying device to the other relaying devices excluding the transmitting relaying device and the subordinate terminal devices. The relaying device in the slave mode transfers an audio signal received from the subordinate terminal device to the subordinate terminal devices excluding the transmitting terminal device and the master relaying device and also transfers an audio signal received from the master relaying device to the subordinate terminal devices.

A program of the present invention causes a control unit of a relaying device comprising a network communication unit connected to a communication network and capable of communication with a plurality of subordinate terminal devices via the communication network and capable of communication with the other relaying devices having the other subordinate terminal devices to function either one of master mode means and slave mode means by switching. The master mode means transfers an audio signal received from the subordinate terminal device to the subordinate terminal devices excluding the transmitting terminal device and the other relaying devices and transfers an audio signal received from another relaying device to the other relaying devices excluding the transmitting relaying device and the subordinate terminal devices. The slave mode means transfers an audio signal received from the subordinate terminal device to the subordinate terminal devices excluding the transmitting terminal device and the master relaying device which is the other specific relaying device and transfers an audio signal received from the master relaying device to the subordinate terminal devices.

Advantageous Effect of Invention

According to the present invention, even if a plurality of relaying devices is mutually connected, full-duplex communication without an echo (bouncing sound) can be realized.

DETAILED DESCRIPTION OF THE EMBODIMENT

Figure 1:
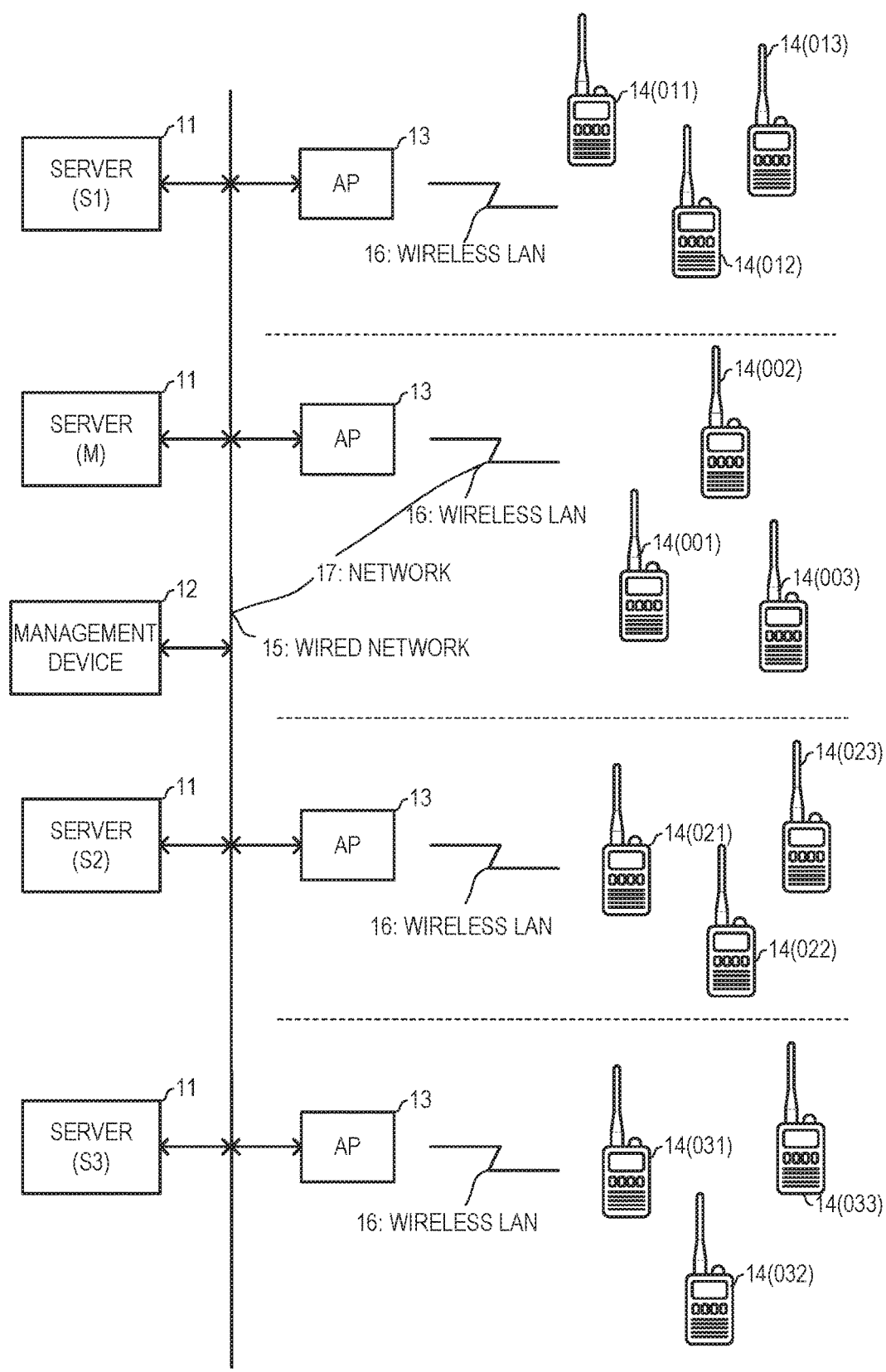
FIG. 1 is a configuration diagram of an audio communication system which is an embodiment of the present invention.
Figures 2, 3:
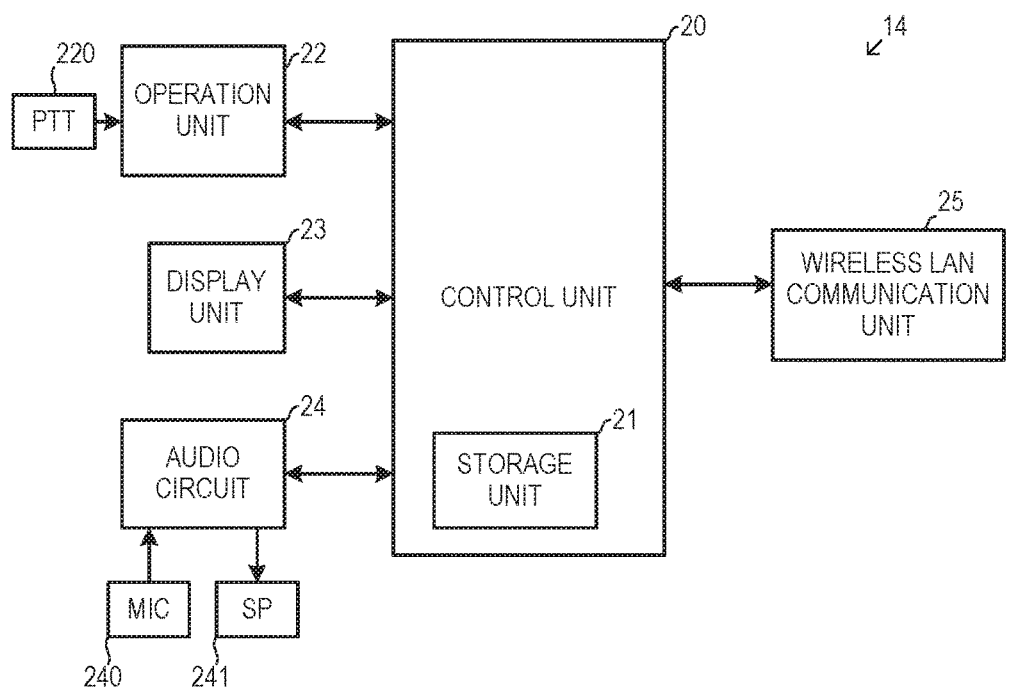
FIG. 2 is a block diagram of a transceiver which is a terminal device.
FIG. 3 is a diagram illustrating an example of configuration of a voice packet.

An audio communication system of the present invention will be described by referring to the attached drawings. FIG. 1 is a configuration diagram of an audio communication system which is an embodiment of the present invention. This audio communication system is capable of mutual communication among a plurality of terminal devices 14 by using a wireless LAN (Local Area Network) 16 such as Wi-Fi. A terminal device 14 has a shape similar to a handy transceiver for radio communication and comprises a PTT (push-to-talk) switch 220 as illustrated in FIG. 2. The terminal device 14 is a wireless network apparatus for transmitting/receiving an voice packet via a wireless access point (AP) 13 in terms of functions. A server 11 which is a relaying device relays mutual communication between the terminal devices 14 via a wired network 15 and the wireless LAN 16. The wired network 15 and the wireless LAN 16 shall be referred to collectively as a network 17 below.

As the wired network 15, a LAN constituted by Ethernet (registered trademark) or the Internet can be applied. When the Internet is used, safe communication can be conducted by using VPN. As the wireless LAN 16, a communication method conforming to IEEE802.11 such as Wi-Fi can be applied. The terminal device 14 and the wireless access point 13 communicate with each other in this communication method.

In FIG. 1, four units of the servers 11 are connected to the wired network 15. In the description below, the four servers 11 are called a master server M, a slave server S1, a slave server S2, and a slave server S3, respectively, in some cases. The master server M communicates with the terminal devices 14 having terminal IDs of 001, 002, and 003 via the wireless access point 13 and manages these terminal devices 14 as subordinate terminals. The slave server S1 communicates with the terminal devices 14 having terminal IDs of 011, 012, and 013 via the wireless access point 13 and manages these terminal devices 14 as subordinate terminals. The slave server S2 communicates with the terminal devices 14 having terminal IDs of 021, 022, and 023 via the wireless access point 13 and manages these terminal devices 14 as subordinate terminals. The slave server S3 communicates with the terminal devices 14 having terminal IDs of 031, 032, and 033 via the wireless access point 13 and manages these terminal devices 14 as subordinate terminals.

Each server 11 relays communication among its own subordinate terminals and also relays communication between its own subordinate terminals and the subordinate terminals of the other servers 11 (communication across the servers). In order to enable full-duplex group communication (communication among two or more terminal devices 14), a plurality of audio signals are mixed and transferred. During mixing, in order to prevent an echo due to reception of audio signal transmitted by itself by each of the terminal devices 14, the audio signal excluding the transmitted audio signal is mixed and transmitted to the terminal device 14 transmitting the audio signal. This processing is called echo-canceling mixing. The group communication is possible among two or more terminal devices 14, but since mutual communication between the two terminal devices 14 is possible also in the individual communication, the group communication is preferably conducted among three or more terminal devices 14.

The audio communication system of the present invention is not limited to the configuration described in FIG. 1. For example, the number of the servers 11 is not limited to four but may be any as long as it is two or more. However, the number of the slave servers Sn may be limited to approximately 10 units depending on processing capacity of the master server M. The number of subordinate terminal devices 14 of each of the servers 11 is not limited to three. However, it may be limited to approximately 100 units depending on processing capacity of the server 11. In the configuration in FIG. 1, the number of the master server M is one, but the system may comprise a plurality of the master servers M. For example, the plurality of master servers M may be in charge of separate groups, respectively, and the group communication may be assigned to any one of the master servers M each time the group communication occurs. It is also possible to allow the slave connected subordinate to the master server M to have a master function so as to hierarchize the master server M.

FIG. 1 illustrates that each of the servers 11 communicates with all of its subordinate terminals via the one wireless access point 13 but the number of the wireless access points 13 used by each server 11 is not limited to one but may be plural. Alternatively, one unit of the wireless access point 13 may be used by a plurality of the servers 11.

In FIG. 1, a management device 12 is connected to the wired network 15. The management device 12 is configured by a personal computer in which a management program is installed or the like. The management device 12 accesses each server 11 in accordance with an operation of an administrator and sets a call destination table or the like illustrated in FIGS. 5A to 5D to each server 11.

FIG. 2 is a block diagram of the terminal device 14. As described above, the terminal device 14 is a wireless network apparatus transmitting/receiving an voice packet via the wireless access point (AP) 13 of the wireless LAN in terms of functions. A control unit 20 controlling an operation of the apparatus is configured by a microprocessor. The control unit 20 has a storage unit 21 storing various types of data. The storage unit 21 stores the configuration information such as a call destination ID with which this terminal device is permitted to communicate. To the control unit 20, an operation unit 22, a display unit 23, an audio circuit 24, and a wireless LAN communication unit 25 are connected. The operation unit 22 includes key switches such as the PTT switch 220 and receives an operation by a user and inputs its operation signal to the control unit 20. The display unit 23 includes a liquid crystal display. On the liquid crystal display, an identification number of the communication partner selected by the operation of the user or the identification number of the incoming caller (communication partner) is displayed.

The audio circuit 24 has a microphone 240 and a speaker 241. The control unit 20 decodes the received voice packet and inputs it in the audio circuit 24. The audio circuit converts this decoded audio signal to an analog signal and outputs it from the speaker 241. The audio circuit 24 converts the audio signal input from the microphone 240 to a digital signal and inputs it in the control unit 20. The control unit 20 makes this digital audio signal into a voice packet and inputs it in the wireless LAN communication unit 25. The wireless LAN communication unit 25 has a circuit for conducting wireless communication in the communication method conforming to the aforementioned IEEE802.11. The wireless LAN communication unit 25 transmits the packet input from the control proton 20 to the wireless access point 13 and also inputs the packet received from the wireless access point 13 to the control unit 20.

When the user inputs audio toward the microphone 240 while pressing the PTT switch 220, the terminal device 14 edits this audio signal into an voice packet and transmits it to the server 11.

The terminal device 14 has a VOX circuit as well as the PTT switch 220. The VOX circuit is a circuit for determining whether a talking voice (audio signal) has been input or not on the basis of an input level of the microphone 240 and its duration and for switching the device into a transmission state (PTT switch on) when it is determined that the talking voice has been input. The terminal device 14 may switch transmission on/off by using the VOX circuit instead of the PTT switch 220 or together with the PTT switch 220. A general transceiver for radio communication conducts communication in a simplex method not capable of receiving a wireless signal during wireless transmission, but since the terminal device 14 conducts packet communication via the wireless LAN 16, transmission of the voice packet and reception of the voice packet can be performed in parallel, and full-duplex method communication can be conducted by using this function. However, even if the full-duplex communication is conducted, the voice packet is edited and transmitted only when the audio signal to be transmitted is input by the PTT switch 220 or the VOX function so that the soundless voice packet is not continuously transmitted.

Configuration of the voice packet will be described by referring to FIG. 3. The voice packet has header information including a destination IP address, a destination port number, a transmission source IP address and a transmission source port number and a data body (payload) including audio data and communication control information. The audio data is an audio signal for 1 thread (20 milliseconds, for example) obtained by digitalization and compression. The destination IP address and the transmission source IP address are IP addresses indicating an immediate destination and an immediate source of this voice packet. The communication control information is information for identifying a communication session and includes a call type, a call destination ID, and a caller ID. The call type is information indicating a form of communication indicating any one of individual communication, group communication or plenary communication. As the call destination ID, a terminal number of the communication partner is applied in the case of the individual communication or a group number in the case of the group communication. As the transmission source ID, the terminal number of the transmission source terminal device 14 is applied in the case of the individual communication or nothing in the case of the group communication and the plenary communication (which will be described later). When the server 11 receives the voice packet from the terminal device 14 or other servers 11, the server 11 takes out the data body from this voice packet, determines a transfer destination of the audio data (audio signal) on the basis of the communication control information, generates a new voice packet and transmits it to the transfer destination. At this time, processing such as mixing of the audio signals is executed as necessary. Details of the mixing and transfer of the audio signals will be described later.

Figures 4, 5A, 5B:
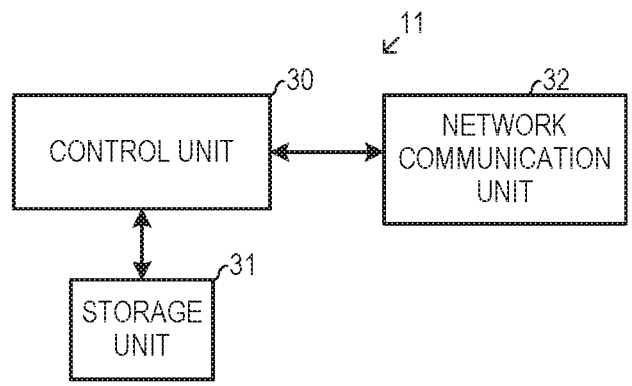
FIG. 4 is a block diagram of a server.
FIG. 5A is a diagram illustrating a call-destination table set in a main server M.
FIG. 5B is a diagram illustrating the call-destination table set in a slave server S1.

FIG. 4 is a block diagram of the server 11. In order to execute the aforementioned processing, the server 11 has a control unit 30, a storage unit 31, and a network communication unit 32. The storage unit 31 is constituted by a hard disk or a RAM, for example, and stores a call destination table illustrated in FIG. 5, configuration information of each of the terminal devices 14 and the like. The control unit 30 performs mixing of the audio signals, set-up of the terminal device 14 at start and the like. The network communication unit 32 is connected to the wired network 15 and controls communication via the network 17.

Here, transfer processing of the audio signal in the individual communication and the group communication will be described. First, the processing of the individual communication will be described. If the call destination terminal device 14 is subordinate to the same server 11 as the transmission source terminal device 14, the audio signal transmitted from the transmission source terminal device 14 is directly transferred by the server 11 to the call destination terminal device 14. If the call destination terminal device 14 is subordinate to the server 11 different from that of the transmission source terminal device 14, the audio signal is transferred from the server 11 managing the transmission source terminal device 14 transmitting the audio signal to the server 11 managing the call destination terminal device 14, and the audio signal is transferred again from the server 11 managing the call destination terminal device 14 to the call destination terminal device 14, thus audio communication is conducted by relaying of these two servers 11.

Subsequently, the processing of the group communication will be described. If all the terminal devices 14 belonging to the group are subordinate to the same server 11 (in the case of a group 1 in FIG. 5), the audio signal transmitted from any one of the terminal devices 14 belonging to the group is transferred to each of the terminal devices 14 belonging the group through the server 11. If the audio signal is transmitted from the plurality of terminal devices 14 at the same time in the full-duplex communication, the server 11 having received these audio signals performs the aforementioned echo-canceling mixing for each of the terminal devices 14 and transfers the mixed audio signal to each of the terminal devices 14. The phrase that "the audio signal is transmitted at the same time" in this description means transmission within one session of a processing cycle of the voice packet (audio data).

If the terminal devices 14 belonging to the group are distributed across subordinates of a plurality of servers 11, the audio signal transmitted from any one of the terminal devices 14 belonging to the group is transferred to the other terminal devices 14 subordinate to the transmission source server 11 and belonging to the group and another server 11 through the server (transmission source server) 11 managing the terminal device 14. The another server means the master server M if the transmission source server 11 is the slave server S1, S2 or S3, and means the slave server S1, /S2 or /S3 having the subordinate terminal device 14 belonging to the group if the transmission source server 11 is the master server M. If the audio signals are transmitted from the plurality of terminal devices 14 at the same time in the full-duplex communication and received by the master server M at the same time, the master server M applies the echo-canceling mixing to these audio signals for each of the slave servers S1, S2 and S3 and transfers the mixed audio signal to each of the slave servers S1, S2 and S3. As a result, even if the group communication is conducted across the plurality of servers 11, the full-duplex communication without bounced echo sound can be conducted. The transfer processing of the audio signal similar to the group communication is also conducted in the plenary communication. That is, the plenary communication is conducted as the group communication of the group to which all the terminal devices 14 belong.

In the communication of this audio communication system, each of the terminal devices 14 designates a communication partner by an identification number, and management of the IP address and the group of each of the terminal devices 14 is performed by the server 11. As a result, it is only necessary for each of the terminal devices 14 to designate the communication partner and to transmit the voice packet to the server 11, and since there is no need to perform a call establishment procedure such as an SIP procedure, communication can be conducted with a use feeling like that of a transceiver in radio communication.

FIGS. 5A to 5D are diagrams illustrating call destination tables provided in the storage units 31 of the master server M and the slave servers S1, S2, and S3, respectively. When each of the servers M, S1, S2, and S3 receives the voice packet from the terminal device 14 or another server 11, it finds a transfer destination of the audio signal (audio data) included in the voice packet by searching this table with the communication type and the call destination ID included in the communication control information of the voice packet. The group for the group communication can be set freely by the administrator, but in this example, it is assumed that the following is set:

Group 1 (G1): belonging terminals (011, 012, 013)
Group 2 (G2): belonging terminals (001, 011, 021)
Group 3 (G3): belonging terminals (012, 022, 032)

The call destination table includes the call type, the call destination ID, terminal information, and server information. The call type is information for discriminating individual call/group call/plenary call from each other. The call destination ID is information for identifying the communication partner of the terminal device 14 or the group. In the case of the individual call, the terminal ID which is the identification information of the terminal device 14 of the communication destination is the call destination ID. That is, since the call destination ID and the terminal information are the same, registration of the terminal information is not indispensable. In the case of the group call, the group number (number starting with G in this embodiment) given to the group is the call destination ID. The terminal information and the server information are information indicating the transfer destination of the audio signal. The terminal information is the terminal number of the terminal device 14 which is a delivery destination (communication partner) of the audio signal in the terminal devices 14 subordinate to the server 11. If there is no terminal device 14 which is the transfer destination of the audio signal under the server 11, this column is blank. The server information is information indicating another server 11 to which the audio signal is to be transferred. In the case of the individual communication, the server information is information of the server 11 managing the terminal device 14 of the communication partner. The server information may be an IP address and a port number of the server 11.

Figures 5C, 5D, 6:
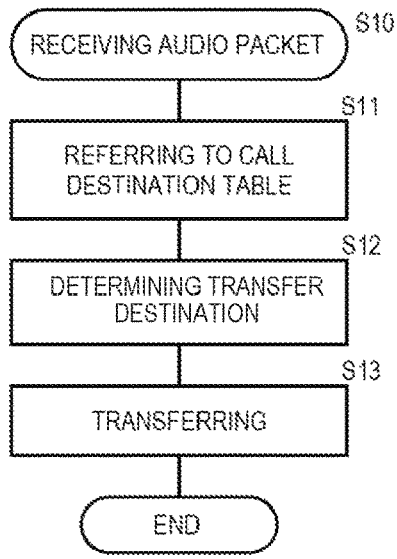
FIG. 5C is a diagram illustrating the call-destination table set in a slave server S2.
FIG. 5D is a diagram illustrating the call-destination table set in a slave server S3.
FIG. 6 is a flowchart illustrating an operation of the server.

In the case of the group communication, regarding the server information, the master server M is designated as the transfer destination as indicated in the call destination tables of FIGS. 5B to 5D in the slave servers S1, S2, and S3. In the master server M, all the servers 11 managing the terminal devices 14 belonging to the group are designated as the transfer destination as illustrated in the call destination table in FIG. 5A.

In the case of a group such as the group 1 (G1) completed in one server 11 (slave server S1), the information of the group communication is registered only in the call destination table of the one server 11. In the case of a group across a plurality of the servers 11 as the group 2 (G2) or the group 3 (G3), transfer of the audio signal among the plurality of servers 11 is performed via the master server M. The master server M applies the echo-canceling mixing to the audio signals transmitted from all the terminal devices 14 belonging to the group and transfers the audio signals to the servers 11 (slave servers S1, S2, and S3) managing the terminal devices 14 belonging to the group. Therefore, the information of the group communication across the plurality of servers 11 as in the group 2 (G2) or the group 3 (G3) is registered in the call destination table (see FIG. 5A) of the master server M in any case and registered in the call destination table (see FIGS. 5B to 5D) of the slave servers S1, S2, and S3 only if there is the terminal device 14 belonging to the group under the server.

In the case of the group 2 (G2), the terminal devices 14 with the terminal numbers 001, 011, and 021 belong to the group, and each of the terminal devices 14 is subordinate to the master server M, the slave servers S1 and S2, respectively. Therefore, the audio signal is transmitted/received among these servers M, S1 and S2. Thus, the information of this group communication (G2) is registered in the call destination tables of these servers M, S1 and S2.

In the case of the group 3 (G3), the terminal devices 14 with the terminal numbers 012, 022, and 032 belong to the group, and each of the terminal devices 14 is subordinate to the slave servers S1, S2, and S3, respectively. The terminal device 14 subordinate to the master server M is not included in this group, but mixing and transfer to each of the slave servers S1, S2, and S3 are performed by the master server M. Therefore, the audio signal of this group communication is transmitted/received between the slave servers S1, S2, S3 and the master server M. Thus, the information of the group communication (G3) is registered in the call destination tables of the servers M, S1, S2, and S3.

The plenary communication is performed as the group communication to which all the terminal devices 14 belong. In the column of plenary call of the call destination table of the master server M (FIG. 5A), all the subordinate terminal devices 14 (001, 002, 003) as the terminal information are registered, and all the slave servers S1, S2, and S3 are registered as the server information. In the column of the plenary call of the call destination tables (FIGS. 5B to 5D) of the slave servers S1, S2, and S3, all the subordinate terminal devices 14 (011, 012, 013/021, 022, 023/031, 032,033) are registered as the terminal information, and the master server M is registered as the server information. Since all the terminal devices 14 capable of communication at that time are communication targets in the plenary communication, it is not indispensable to register the subordinate terminal devices 14 in the terminal information of each of the servers 11 in advance.

In the embodiment in FIG. 5, the information of the group communication is registered only in the call destination table of the server 11 relaying the audio signal but it may be also registered in the call destination table of the server 11 not relaying the audio signal. The group communication (call to the group) from the terminal device 14 not belonging to the group may be allowed. In this case, each of the servers 11 handles the terminal device 14 not belonging to the group having made the call as a member of the group during the communication session of this group communication.

The terminal device 14 downloads the configuration information from the server 11 when an operation is started (power is on). The configuration information includes the call destinations allowed by its own apparatus. The allowed call destinations are sequentially displayed on the display unit 23 of the terminal device 14 by the operation of the user. The user can start audio communication to the call destination (individual/group/plenary) by selecting the desired call destination and turning on the PTT switch 220 or by starting a call toward the microphone 240.

If the terminal device 14 with the terminal number 011 makes a group call of the group G2, for example, the voice packet containing the communication control information and the audio signal is received by the slave server S1. The slave server S1 makes the audio signal and the communication control information into a voice packet of the group G2 destined to the master server M and transfers it to the master server M. The master server M transfers the voice packet to the subordinate terminal device 14 (terminal number 001) belonging to the group G2 and calls it and also generates the voice packet of the group G2 destined to the slave server S2 and transmits it to the slave server S2. The slave server S2 transfers this voice packet to the terminal device with the terminal number 021 and calls it as the group G2 member.

FIG. 6 is a flowchart illustrating the operation of the server 11 when the voice packet (audio signal) is received. When the server 11 receives the voice packet from the terminal device 14 or another server 11 (S10), the server 11 refers to the call destination table in FIG. 5 (S11), and determines a transfer destination of the audio signal included in this voice packet (S12). The server 11 generates a voice packet to the determined transfer destination and transfers this audio signal (S13). In the case of the group communication, the other audio signals are mixed in accordance with each of the transfer destinations, and a voice packet describing the communication control information according to the group communication is generated.

Figure 7:
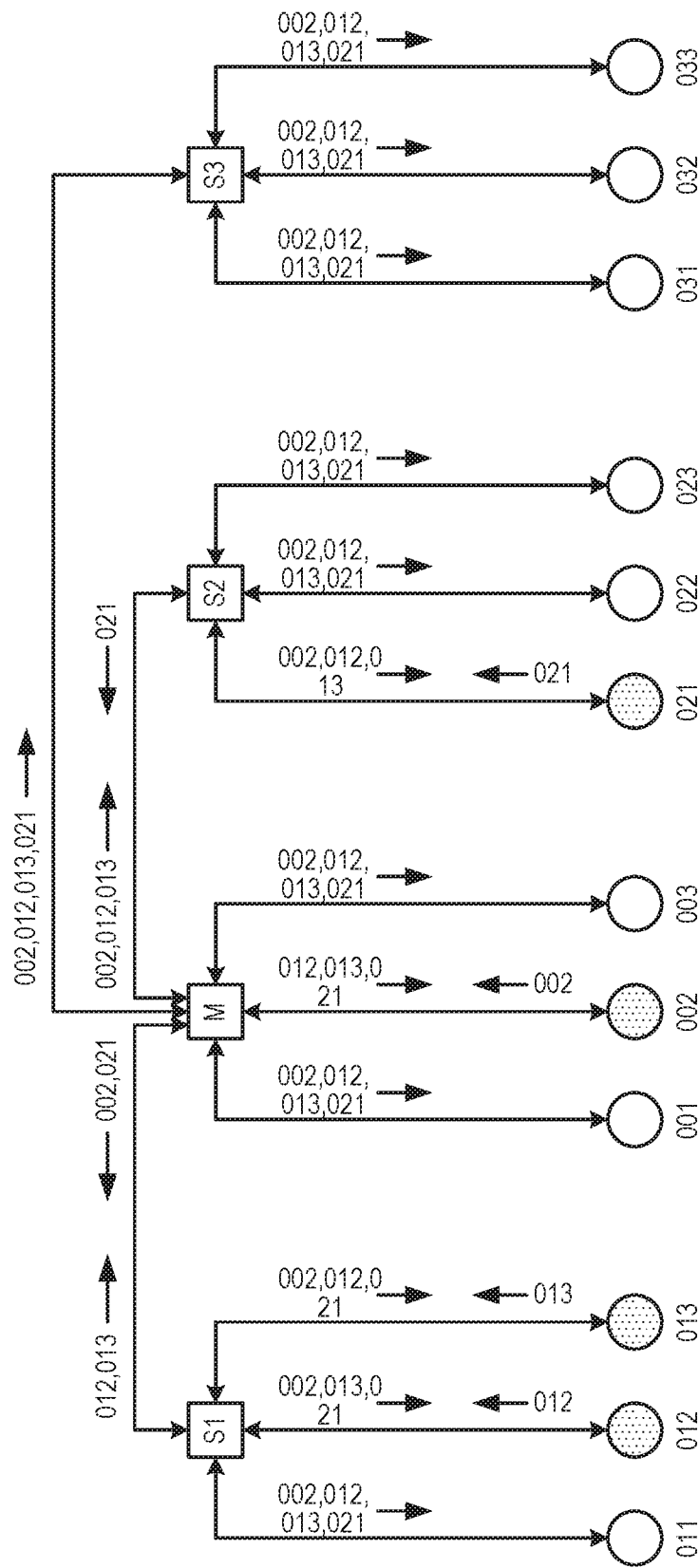
FIG. 7 is a chart for explaining a form of transfer and mixing of the voice packet in plenary communication.

FIG. 7 is a chart exemplifying the echo-canceling mixing and a form of transfer of the audio signal when the plenary communication is conducted in the audio communication system illustrated in FIG. 1. In the description of this figure, a terminal device 14 with the terminal number n is called a terminal n, and an audio signal transmitted from the terminal n is called an audio signal (n). An audio signal obtained by mixing an audio signal m and an audio signal n is called an audio signal (m, n). This figure illustrates a state in which the terminal 002, the terminal 012, the terminal 013, and the terminal 021 are on talking, that is, they are transmitting the audio signals in the full-duplex plenary communication.

The slave server S1 receives the audio signal (012) and the audio signal (013), respectively, from the terminal 012 and the terminal 013 which are the subordinate terminal devices 14. Moreover, the mixed audio signal (002, 021) of the terminal 002 and the terminal 021 is transmitted from the master server M. The slave server S1 applies the echo-canceling mixing to them and transmits the mixed signal to each of the subordinate terminal devices 14 and the master server M. That is, to the terminal 011 not transmitting the audio signal, the mixed audio signal (002, 012, 013, 021) of mixed all the received audio signals is transmitted. To the terminal 012 transmitting the audio signal (012), the mixed audio signal (002, 013, 021) of mixed all the received audio signals except the audio signal (012) is transmitted. To the terminal 013 transmitting the audio signal (013), the mixed audio signal (002, 012, 021) of mixed all the received audio signals except the audio signal (013) is transmitted. Moreover, to the master server M, the mixed audio signal (012, 013) of mixed the audio signals received from the subordinate terminal 012 and terminal 013 is transmitted.

The slave server S2 receives the audio signal (021) from the terminal 021 which is the subordinate terminal device 14. Moreover, the mixed audio signal (002, 012, 013) of the terminal 002, the terminal 012, and the terminal 013 is transmitted from the master server M. The slave server S2 applies the echo-canceling mixing to them and transmits the mixed signal to each of the subordinate terminal devices 14 and the master server M. That is, to the terminal 021 transmitting the audio signal (021), the mixed audio signal (002, 012, 013) of mixed all the received audio signals except the audio signal (021) is transmitted. To the terminal 022 and the terminal 023 not transmitting the audio signal, the mixed audio signal (002, 012, 013, 021) of mixed all the received audio signals is transmitted. To the master server M, the audio signal (021) received from the subordinate terminal 021 is transmitted.

The slave server S3 does not received the audio signal from the subordinate terminal device 14, and the mixed audio signal (002, 012, 013, 021) of the terminal 002, the terminal 012, the terminal 013, and the terminal 021 is transmitted from the master server M. Thus, to the terminal 031, the terminal 032, and the terminal 033 which are all the subordinate terminal devices 14, the mixed audio signal (002, 012, 013, 021) is transmitted. No signal is transmitted to the master server M.

The master server M receives the audio signal (002) from the terminal 002 which is the subordinate terminal device 14. Moreover, the mixed audio signal (012, 013) of the terminal 012 and the terminal 013 is transmitted from the slave server S1. The audio signal (021) of the terminal 021 is transmitted from the slave server S2. The master server M applies the echo-canceling mixing to them and transmits the mixed signal to each of the subordinate terminal devices 14 and the slave servers S1, S2, and S3. That is, to the terminal 001 and the terminal 003 not transmitting the audio signal, the mixed audio signal (002, 012, 013, 021) of mixed all the received audio signals is transmitted. To the terminal 002 transmitting the audio signal (002), the mixed audio signal (012, 013, 021) of mixed all the received audio signals except the audio signal (002) is transmitted. To the slave server S1, the mixed audio signal (002, 021) of mixed the audio signal (002) received from the subordinate terminal 002 and the audio signal (021) received from the slave server S2 is transmitted. To the slave server S2, the mixed audio signal (002, 012, 013) of the audio signal (002) received from the subordinate terminal 002 and the mixed audio signal (012, 013) received from the slave server S1 is transmitted. To the slave server S3, the mixed audio signal (002, 012, 013, 021) of the audio signal (002) received from the subordinate terminal 002, the mixed audio signal (012, 013) received from the slave server S1, and the audio signal (021) received from the slave server S2 is transmitted.

As described above, by collecting the communication across the servers to one server (master server M) and by applying the echo-canceling mixing, even if the number of servers is large, the echo-canceling mixing can be performed without complicating the communication.

REFERENCE NUMERALS

11 Server (Relaying device)
12 Management device
13 Wireless access point
14 Terminal device
20 Control unit (for terminal device)
30 Control unit (for server)
32 Network communication unit
220 PTT (push-to-talk) switch
M Master server
S1, S2, S3 Slave server

What is claimed is:

1. A relaying device selectively operating in a master mode and a slave mode and connected to a communication network to which other relaying devices and plurality of terminal devices are also connected, the relaying device comprising:
    a network communication unit connected to the communication network and configured to communicate with a first group of the terminal devices and also configured to communicate with the other relaying devices each having a second group of the terminal devices communicating therewith; and
    a control unit causing the relaying device to operate in the master mode or in the slave mode, wherein
    during group communication in which two or more of the terminal devices communicate with each other,
    in the master mode, the control unit transfers a first audio signal received from one of the terminal devices of the first group to the other of the terminal devices of the first group and the other relaying devices that are in the slave mode, and also transfers a second audio signal received from one of the other relaying devices that is in the slave mode to the other of the other relaying devices that is in the slave mode and the terminal devices in the first group; and
    in the slave mode, the control unit transfers the first audio signal received from one of the terminal devices of the first group to the other of the terminal devices of the first group and one of the other relaying devices that is in the master mode, and also transfers the second audio signal received from the one of the other relaying devices that is in the master mode to the terminal devices of the first group.

2. The relaying device according to claim 1, wherein during individual communication in which communication is conducted between the one of the terminal devices of the first group and one of the terminal devices of the second group that is subordinate to one of the other relaying devices, the control unit transfers the first audio signal received from the one of the terminal devices of the first group directly to the one of the other relaying devices managing the one of the terminal devices of the second group.

3. An audio communication system comprising:
    a master relaying device and a plurality of slave relaying devices connected to each other via a communication network;
    a first group of terminal devices connected to the master relaying device via the communication network; and
    a second group of terminal devices each of which is connected to either of the slave relaying devices via the communication network, wherein
    during group communication in which two or more terminal devices belonging to a group communicate with each other in the group,
    one of the slave relaying devices transfers a second audio signal received from one of the terminal devices of the second group connected to the one of the slave relaying devices to the other of the terminal devices of the second group connected to the one of the slave relaying devices and to the master relaying device, and transfers a first audio signal received from the master relaying device to the terminal devices of the second group connected to the one of the slave relaying devices;

the master relaying device transfers the first audio signal received from one of the terminal devices of the first group to the other of the terminal devices of the first group and to the slave relaying devices, and transfers the second audio signal received from one of the slave relaying devices to the other of the slave relaying devices and to the terminal devices of the first group.

4. A transfer method of an audio signal, comprising:

providing a relaying device selectively operating in a master mode and a slave mode, the relaying device comprising a network communication unit connected to a communication network, configured to communicate with a first group of terminal devices configured to communicate with other relaying devices each having a second group of terminal devices communicating therewith;

in the master mode, by the relaying device, transferring a first audio signal received from one of the terminal devices of the first group to the other of the terminal devices of the first group and the other relaying devices that are in the slave mode, and transferring a second audio signal received from one of the other relaying devices that is in the slave mode to the other of the other relaying devices that are in the slave mode and the terminal devices in the first group; and in the slave mode, by the relaying device, transferring the first audio signal received from one of the terminal devices of the first group to the other of the terminal devices of the first group and one of the other relaying devices in the master mode and also transferring of the first audio signal received from the one of the other relaying devices in the master mode to the terminal devices of the first group.

5. The audio communication system according to claim 3, further comprising another relaying device, wherein one of the slave relaying devices functions as a second layer master relaying device toward the another relaying device and the another relaying device functions as a second layer slave relaying device toward the one of the slave relaying devices.

\* \* \* \* \*